(12) United States Patent
Lee et al.

(10) Patent No.: US 10,986,715 B1
(45) Date of Patent: Apr. 20, 2021

(54) LED DRIVING CIRCUIT AND METHOD

(71) Applicant: INDUSTRIAL TECHNOLOGY RESEARCH INSTITUTE, Hsinchu (TW)

(72) Inventors: Ching-Ran Lee, Kinmen County (TW); Chi-Chun Huang, Toufen (TW); Che-Min Kung, Zhubei (TW); Wen-Tien Tsai, Pingtung County (TW); Yu-Jen Chen, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/702,028

(22) Filed: Dec. 3, 2019

(30) Foreign Application Priority Data

Nov. 25, 2019 (TW) .................................. 108142744

(51) Int. Cl.
*H05B 45/37* (2020.01)
*H05B 45/395* (2020.01)
(Continued)

(52) U.S. Cl.
CPC ........... *H05B 45/37* (2020.01); *H05B 45/395* (2020.01)

(58) Field of Classification Search
CPC ........ H05B 45/37; H05B 45/10; H05B 45/20; H05B 45/48; H05B 45/00; H05B 45/50;
(Continued)

(56) References Cited

U.S. PATENT DOCUMENTS

| 6,989,807 | B2 | 1/2006 | Chiang |
| 8,324,840 | B2 | 12/2012 | Shteynberg et al. |

(Continued)

FOREIGN PATENT DOCUMENTS

| CN | 203813986 U | 9/2014 |
| CN | 204795790 U | 11/2015 |

(Continued)

OTHER PUBLICATIONS

Fu et al., "A novel AC Direct Linear LED driver with Unity Power Factor, Low Input Current THD, Low Light Flicker and Low Profile.", PCIM Europe. pp. 655-661, Jun. 5-7, 2018.

(Continued)

*Primary Examiner* — Wei (Victor) Y Chan
(74) *Attorney, Agent, or Firm* — Birch, Stewart, Kolasch & Birch LLP

(57) ABSTRACT

In driving a segmented LED loading, an alternating current (AC) voltage is rectified into a direct current (DC) voltage; the DC voltage is regulated into an input voltage and the input voltage is maintained higher than a lowest voltage used for lighting at least one LED segment of the segmented LED loading; the input voltage and a current flowing through the segmented LED loading is detected to generate a switch control signal and a current control signal; respective operation states of each of a plurality of switches of a LED segment switch module are controlled by the switch control signal to control each LED segment of the segmented LED loading as power-supply state or no-power-supply state; and the current of the segmented LED loading is regulated based on the current control signal.

13 Claims, 6 Drawing Sheets

(51) Int. Cl.
*H05B 45/20* (2020.01)
*H05B 45/48* (2020.01)
*H05B 45/00* (2020.01)

(58) Field of Classification Search
CPC ...... H05B 47/105; H05B 47/10; H05B 47/19; H05B 47/16; H05B 45/46
USPC .............................. 315/307, 291, 297, 185 R
See application file for complete search history.

(56) References Cited

U.S. PATENT DOCUMENTS

| | | | |
|---|---|---|---|
| 8,339,049 B2 | 12/2012 | Kang et al. | |
| 9,000,678 B2 | 4/2015 | Huynh | |
| 9,398,656 B2 | 7/2016 | Gray et al. | |
| 2009/0218960 A1* | 9/2009 | Lyons | F21K 9/62 315/297 |
| 2011/0227489 A1 | 9/2011 | Huynh | |
| 2012/0081009 A1* | 4/2012 | Shteynberg | H05B 45/48 315/122 |
| 2013/0026924 A1 | 1/2013 | Jong et al. | |
| 2014/0191676 A1 | 7/2014 | Seider et al. | |
| 2014/0361696 A1 | 12/2014 | Siessegger et al. | |
| 2015/0002035 A1* | 1/2015 | Schie | H01L 29/7455 315/200 R |
| 2016/0381751 A1* | 12/2016 | Bong | F21K 9/20 315/193 |
| 2017/0019969 A1* | 1/2017 | O'Neil | H05B 45/37 |
| 2019/0037659 A1 | 1/2019 | Chen et al. | |

FOREIGN PATENT DOCUMENTS

| | | |
|---|---|---|
| CN | 103687150 B | 2/2016 |
| CN | 104871645 B | 12/2016 |
| DE | 102015117481 A1 | 4/2017 |
| TW | 1449458 B | 8/2014 |
| TW | M496088 U | 2/2015 |
| TW | I610595 B | 1/2018 |

OTHER PUBLICATIONS

Gao et al., "An AC Input Switching-Converter-Free LED Driver With Low-Frequency-Flicker Reduction", IEEE Journal of Solid-State Circuits, vol. 52, No. 5, 43 pp. 1424-1434, May 2017.

Ko et al., "A Compact Flicker-Free Transformer-Less LED Driver With an Enhanced Power Factor for Omnidirectional Multichannel Smart Bulb Applications", IEEE Transactions on Power Electronics, vol. 31, No. 8 pp. 5851-5862, Aug. 2016.

Lam et al., "A Modified Valley Fill Electronic Ballast Having a Current Source Resonant Inverter With Improved Line-Current Total Harmonic Distortion (THD), High Power Factor, and Low Lamp Crest Factor", IEEE Transactions on Industrial Electronics, vol. 55, No. 3, pp. 1147-1159, Mar. 2008.

Su et al., "Inductorless and Electrolytic Capacitorless Pseudo-Sine Current Controller in LED Lighting System with 1.1W/2.2W Power Reduction", IEEE, 4 pages, 2012.

Sun et al., "A Fully-integrated Compact LED Module with Inductorless and Capacitor-less LED Driver", IEEE. 4 pgs. 2013.

European Search Report dated Oct. 27, 2020, in Application No. 20171772.

* cited by examiner

LED DRIVING CIRCUIT AND METHOD

CROSS-REFERENCE TO RELATED APPLICATION

This application claims the priority benefit of Taiwan application serial no. 108142744, filed on Nov. 25, 2019. The entirety of the above-mentioned patent application is hereby incorporated by reference herein and made a part of this specification.

TECHNICAL FIELD

The disclosure is related to a LED (light emitting diode) driving circuit and method thereof.

BACKGROUND

LED (light emitting diode) linear power supply for has advantages, such as low cost, small size, no Electromagnetic Interference (EMI) and simple structure, and thus is common used in indoor lighting or size-limited lighting. However, LED linear power supply has problems, such as low efficiency and flicking. Flicking problem is caused by current blind area and inconstant light intensity.

In now, the current blind area may be solved by adding a single-stage energy storage capacitor into the LED driving circuit. However, due to high energy-storage demand, the single-stage energy storage capacitor is usually implemented by an electrolytic capacitor which is large circuit size but low life cycle.

Besides, in order to improve efficiency, segmented LED loading may be used, but flicking problems are severe because of instant light intensity of segmented LED loading.

SUMMARY

One embodiment of the disclosure provides a light emitting diode (LED) driving circuit for driving a segmented LED loading, the LED driving circuit including: a rectifying circuit for rectifying an alternating current (AC) voltage into a direct current (DC) voltage; an adaptive voltage regulating circuit, coupled to the rectifying circuit, the adaptive voltage regulating circuit regulating the DC voltage into an input voltage and maintaining the input voltage higher than a lowest voltage used for lighting at least one LED segment of the segmented LED loading; an LED segment regulating control module coupled to the adaptive voltage regulating circuit for detecting the input voltage and a current flowing through the segmented LED loading to generate a switch control signal and a current control signal; an LED segment switch module coupled to the LED segment regulating control module, the LED segment switch module including a plurality of switches, respective operation states of each of the switches being controlled by the switch control signal to control each LED segment of the segmented LED loading as power-supply state or no-power-supply state; and an LED current regulating module coupled to the LED segment regulating control module and the segmented LED loading, the LED current regulating module being controlled by the current control signal to regulate the current of the segmented LED loading.

Another embodiment of the disclosure provides a light emitting diode (LED) driving method for driving a segmented LED loading, the LED driving method including: rectifying an alternating current (AC) voltage into a direct current (DC) voltage; regulating the DC voltage into an input voltage and maintaining the input voltage higher than a lowest voltage used for lighting at least one LED segment of the segmented LED loading; detecting the input voltage and a current flowing through the segmented LED loading to generate a switch control signal and a current control signal; controlling respective operation states of each of a plurality of switches of a LED segment switch module by the switch control signal to control each LED segment of the segmented LED loading as power-supply state or no-power-supply state; and regulating the current of the segmented LED loading based on the current control signal.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 1:
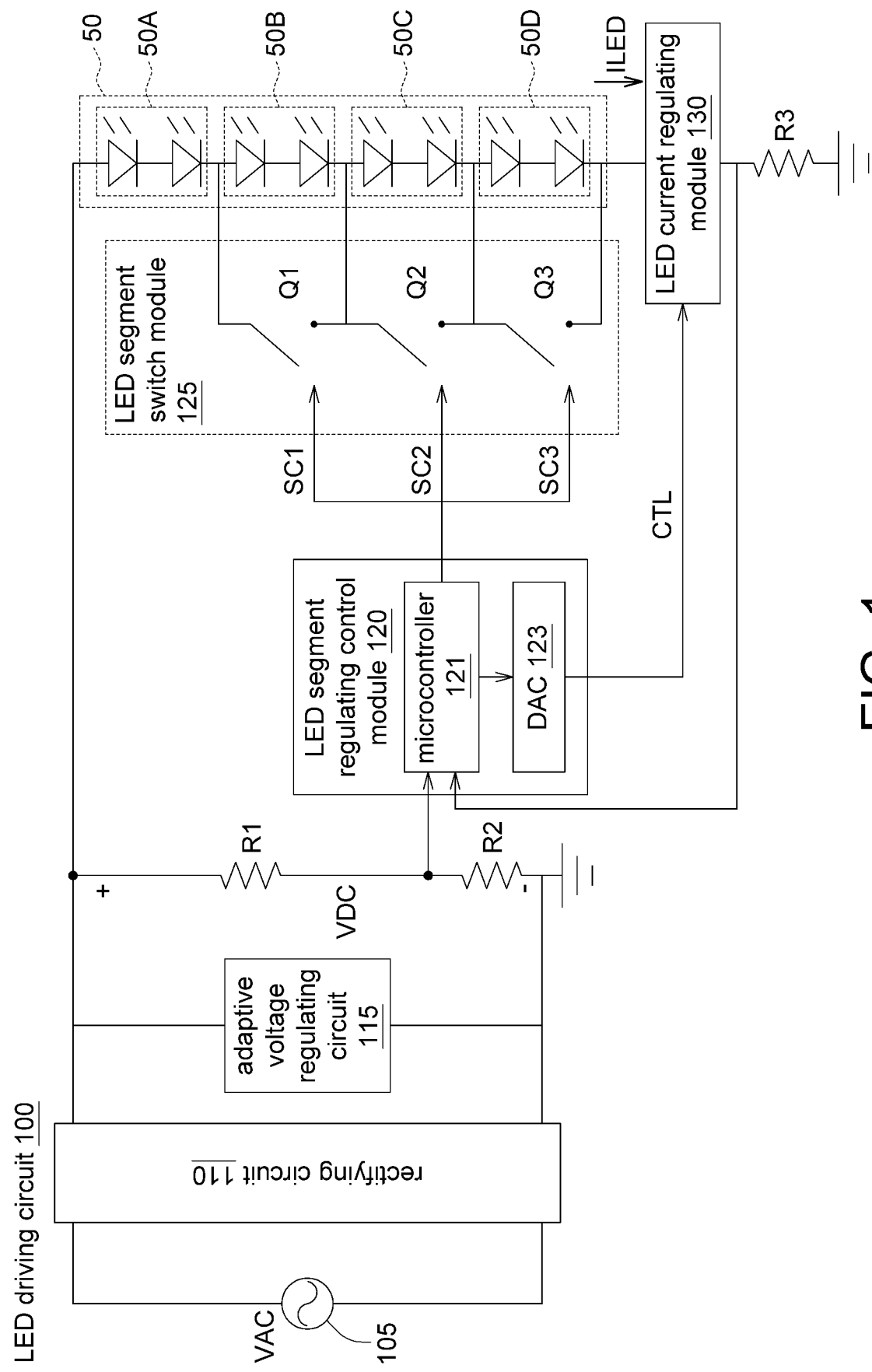
FIG. 1 shows a functional block diagram of an LED driving circuit according to one embodiment of the disclosure.

FIG. 1 shows a functional block diagram of an LED driving circuit according to one embodiment of the disclosure. The LED driving circuit 100 is for driving a segmented LED loading 50. The segmented LED loading 50 includes a plurality of LED segments. For simplicity, for example but not limited by, in embodiments of the disclosure, the segmented LED loading 50 includes four LED segments 50A-50D and each LED segments 50A-50D includes two LEDs.

The LED driving circuit 100 includes a rectifying circuit 110, an adaptive voltage regulating circuit 115, an LED segment regulating control module 120, an LED segment switch module 125 and an LED current regulating module 130. The LED driving circuit 100 optionally includes resistors R1-R3.

The rectifying circuit 110 is for rectifying alternating current (AC) voltage VAC into a direct current (DC) voltage.

The adaptive voltage regulating circuit 115 is coupled to the rectifying circuit 110 for regulating the DC voltage which is rectified into an input voltage VDC and for maintaining the input voltage VDC higher than a lowest voltage used for lighting at least one LED segment of the segmented LED loading 50. In other words, the input voltage VDC is affected by the rectifying circuit 110 and the adaptive voltage regulating circuit 115. "The lowest voltage" in here means a minimum voltage for lighting the at least one LED segment of the segmented LED loading 50. For example, the cut-in voltage of one single LED is 20V (the cut-in voltage referring to the voltage to turn on the single LED). As shown in FIG. 1, "the lowest voltage" refers to the minimum voltage for lighting the LED segment which having the fewest LEDs, that is, 40V. If the segmented LED loading 50 has different arrangements, then "the lowest voltage" may be different. Details of the adaptive voltage regulating circuit 115 are as follows.

The LED segment regulating control module 120 is coupled to the adaptive voltage regulating circuit 115 for detecting the input voltage VDC (or detecting a divided voltage of the input voltage VDC) and for detecting a current ILED flowing through the segmented LED loading 50 to generate switch control signals SC1-SC3 and a current control signal CTL, to determine operation states of the LED segment switch module 125 and to determine the current ILED of the segmented LED loading 50. In details, based on the input voltage VDC (or the divided voltage of the input voltage VDC), the LED segment regulating control module 120 generates the (switch) control signals (the control signals SC1-SC3 in FIG. 1) to the LED segment switch module 125 to determine operation states of the LED segment switch module 125. Based on the input voltage VDC (or the divided voltage of the input voltage VDC) and the current ILED of the segmented LED loading 50, the LED segment regulating control module 120 generates the (current) control signal CTL to the LED current regulating module 130 to control the current ILED of the segmented LED loading 50.

The LED segment switch module 125 is coupled to the LED segment regulating control module 120. The LED segment switch module 125 includes a plurality of switches, and respective operation states of each of the switches are controlled by the switch control signals from the LED segment regulating control module 120. Because respective operation states of each of the switches are controlled by the switch control signals, the connection state or disconnection state of each of the switches may be adjusted and thus each LED segment of the segmented LED loading is in power-supply state or no-power-supply state. By this, the voltage of the segmented LED loading is varied in stages.

For example, in FIG. 1, the LED segment switch module 125 includes three switches Q1-Q3 controlled by the switch control signals SC1-SC3, respectively.

If the LED segment regulating control module 120 determines to only turn on the LED segment 50A, then the switch control signals SC1-SC3 from the LED segment regulating control module 120 control the switches Q1-Q3 to be all connected. Thus, the current ILED flows through the LED segment 50A but not through the LED segments 50B-50D.

Similarly, if the LED segment regulating control module 120 determines to turn on the LED segments 50A and 50B, then the switch control signals SC1-SC3 from the LED segment regulating control module 120 control to connect the switches Q2-Q3 and to disconnect the switch Q1. Thus, the current ILED flows through the LED segment 50A-50B but not through the LED segments 50C-50D.

The LED current regulating module 130 is coupled to the LED segment regulating control module 120 and the segmented LED loading 50. The LED current regulating module 130 is controlled by the current control signal CTL from the LED segment regulating control module 120 to regulate the current of the segmented LED loading 50.

The LED segment regulating control module 120 includes a microcontroller 121 and a digital-to-analog converter (DAC) 123. The microcontroller 121 is coupled to the DAC 123. The microcontroller 121 is for outputting the switch control signals SC1-SC3 to the LED segment switch control module 125 based on the input voltage VDC (or the divided voltage of the input voltage VDC) and the current ILED of the segmented LED loading 50, to decide the respective operation states of each of the switches Q1-Q3 of the LED segment switch module 125. Further, the microcontroller 121 outputs signals to the DAC 123 based on the input voltage VDC (or the divided voltage of the input voltage VDC) and the current ILED of the segmented LED loading 50; and accordingly the DAC 123 outputs the current control signal CTL to the LED current regulating module 130 to control the current ILED of the segmented LED loading 50.

Further, the LED driving circuit 100 may further include a voltage dividing circuit formed by the resistors R1 and R2. The voltage dividing circuit is for dividing the input voltage VDC. The LED segment regulating control module 120 may detect the divided voltage. That is, the microcontroller 121 of the LED segment regulating control module 120 may control the LED segment switch module 125 and the LED current regulating module 130 based on the divided voltage of the input voltage VDC. In FIG. 1, the resistor R3 is coupled between the LED current regulating module 130 and ground terminal (GND). The resistor R3 is as a current detecting resistor, for converting the current into a voltage signal to feedback electronic information.

In one embodiment of the disclosure, a number of LED segments of the segmented LED loading 50 is larger or equal to 2; and a number of switches of the LED segment switch module 125 is higher or equal to the number of LED segments of the segmented LED loading 50 minus 1.

FIG. 2A to FIG. 2D show circuit structure, charging operations, discharging operations and voltage waveforms of the adaptive voltage regulating circuit according to one embodiment of the disclosure. The adaptive voltage regulating circuit 115 is a valley fill circuit having a plurality stages of capacitors. In one embodiments of the disclosure, the adaptive voltage regulating circuit 115 includes capacitors C1-C3 and diodes D1-D6.

Figure 2A:
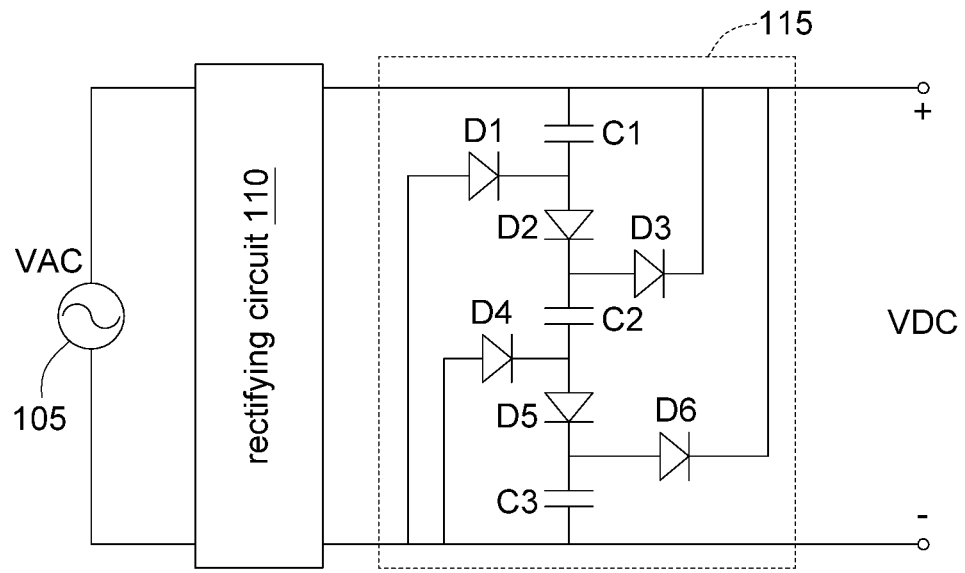
FIG. 2A to FIG. 2D show circuit structure, charging operations, discharging operations and voltage waveforms of an adaptive voltage regulating circuit according to one embodiment of the disclosure.
Figure 2B:
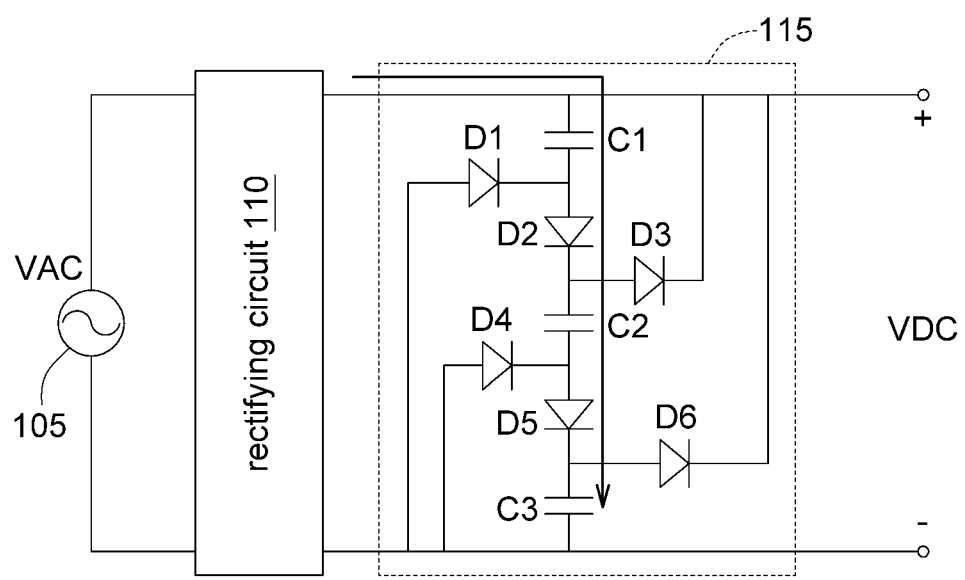
Figure 2C:
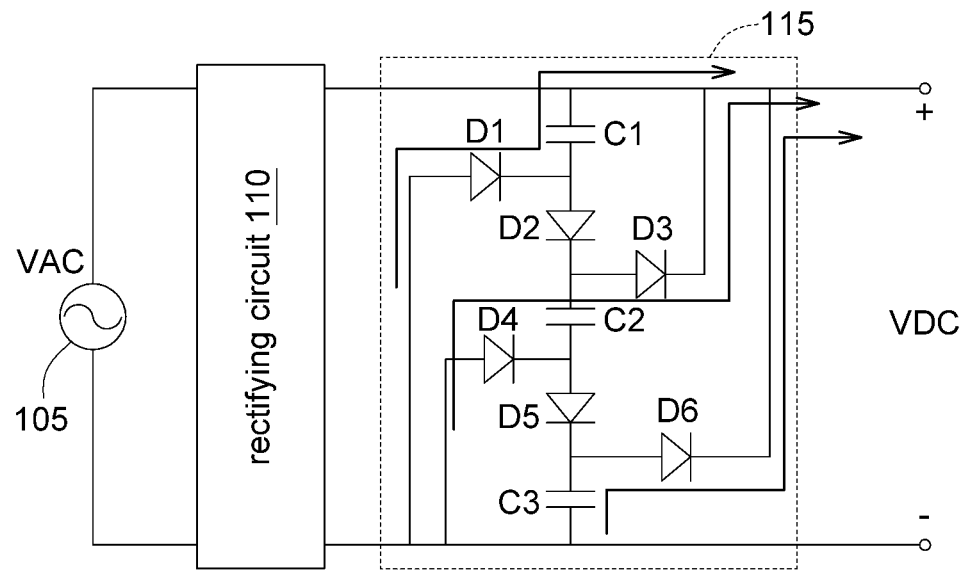

FIG. 2A to FIG. 2C is exemplified by three-stage valley fill circuit, but the disclosure is not limited by this. The adaptive voltage regulating circuit 115 according to one embodiment of the disclosure is a passive adaptive voltage regulating circuit, or said multi-stage valley fill serial circuit. In charging, the capacitors C1-C3 are charged in serial, the power supply and the energy are evenly distributed on the capacitors C1-C3. Thus, the capacitors C1-C3 may have lower capacitance withstand voltage. In discharging, the capacitors C1-C3 are charged in parallel. By the parallel discharging, the equivalent capacitance in discharging is increased, the lowest voltage is stable and energy is provided from the capacitors C1-C3 to the segmented LED loading 50.

The capacitors C1-C3 may have the same capacitance. When the DC voltage rectified by the rectifying circuit 110 is higher than a total voltage from the serially-connected capacitors C1-C3, the DC voltage rectified by the rectifying circuit 110 charges the serially-connected capacitors C1-C3. When the DC voltage rectified by the rectifying circuit 110 is lower than the total voltage from the serially-connected capacitors C1-C3, charge to the capacitors C1-C3 is stopped. Further, when the DC voltage rectified by the rectifying circuit 110 is higher than the capacitor cross voltage from the parallel-connected capacitors C1-C3, the DC voltage is directed used as the input voltage VDC generated from the adaptive voltage regulating circuit 115. That is, the segmented LED loading 50 is turned on by the DC voltage rectified by the rectifying circuit 110, as shown in FIG. 2B. Thus, when the DC voltage rectified by the rectifying circuit 110 is higher than the capacitor cross voltage from the parallel-connected capacitors C1-C3, the input voltage VDC is determined based on the DC voltage rectified by the rectifying circuit 110.

On the contrary, when the DC voltage rectified by the rectifying circuit 110 is lower than the capacitor cross voltage from the parallel-connected capacitors C1-C3, the capacitors C1-C3 are in parallel discharge to generate the input voltage VDC of the adaptive voltage regulating circuit 115 for turning on the segmented LED loading 50, as shown in FIG. 2C. Thus, when the capacitors C1-C3 are in discharge, the input voltage VDC is determined based on the capacitor cross voltage from the parallel-connected capacitors C1-C3.

Figure 2D:
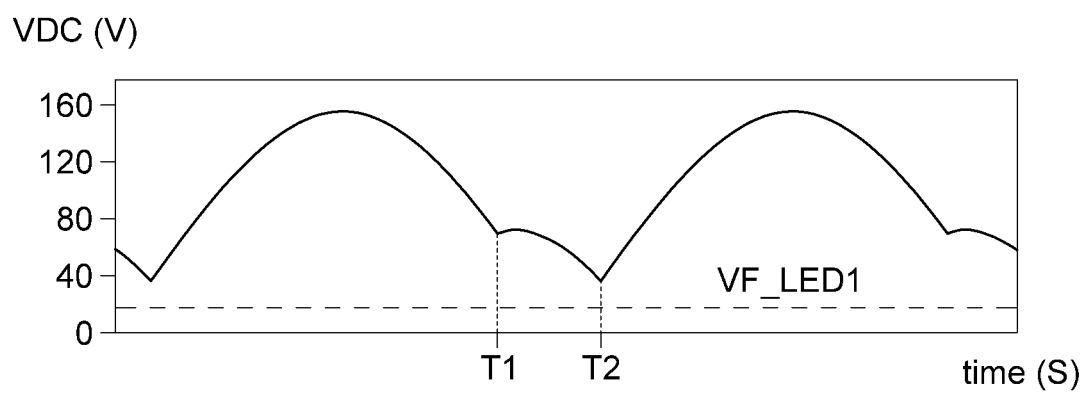

As shown in FIG. 2D, before the timing T1, the DC voltage rectified by the rectifying circuit 110 is used as the input voltage VDC to turn on the segmented LED loading 50. During the timing T1-T2, the capacitors C1-C3 are in discharge, and the capacitor cross voltage of the parallel-connected capacitors C1-C3 should be higher than the lowest voltage. Further, during the timing T1-T2, because the capacitors C1-C3 are in parallel discharge, the capacitor cross voltage of the parallel-connected capacitors C1-C3 is decreasing, but the capacitor cross voltage of the parallel-connected capacitors C1-C3 should be higher than the lowest voltage to continuously turn on at least one LED segment of the segmented LED loading 50. By so, the current blind area is prevented and thus the LED flicking is also prevented. As shown in FIG. 2D, "VF_LED1" refers to the lowest voltage.

In one embodiment of the disclosure, the structure design of the multi-stage valley fill circuit (i.e. the adaptive voltage regulating circuit 115) is to make sure the total output (i.e. the input voltage VDC) of the rectifying circuit 110 and the adaptive voltage regulating circuit 115 is always higher than the lowest voltage of the segmented LED loading 50. Also, the number of the capacitors and the capacitance of the capacitors of the adaptive voltage regulating circuit 115 may meet the lowest requirement of capacitor energy storage. Thus, compared to the large-size electrolytic capacitor used in the prior art, the adaptive voltage regulating circuit 115 of one embodiment of the disclosure may have advantages of small size and longer life cycle due to omission of large-size electrolytic capacitor.

Further, in other possible embodiment of the disclosure, the adaptive voltage regulating circuit 115 may be implemented by an electrical energy conversion circuit having active power switches. The lowest output voltage of the adaptive voltage regulating circuit 115 is higher than the lowest voltage, to provide the LED loading current related to the lowest voltage.

Further, in other possible embodiment of the disclosure, the LED segment regulating control module 120 determines the operation states of the LED segment switch module 125 and the current ILED of the segmented LED loading 50 in that: when the input voltage VDC is increased, controlling the respective operation states of the switches Q1-Q3 of the LED segment switch module 125 to increase a number of turn-on LEDs of the segmented LED loading 50 and to decrease the current ILED of the segmented LED loading 50; and when the input voltage VDC is decreased, controlling the respective operation states of the switches Q1-Q3 of the LED segment switch module 125 to decrease the number of the turn-on LEDs of the segmented LED loading 50 and to increase the current ILED of the segmented LED loading 50. By so, the constant light intensity is achieved.

Figure 3A:
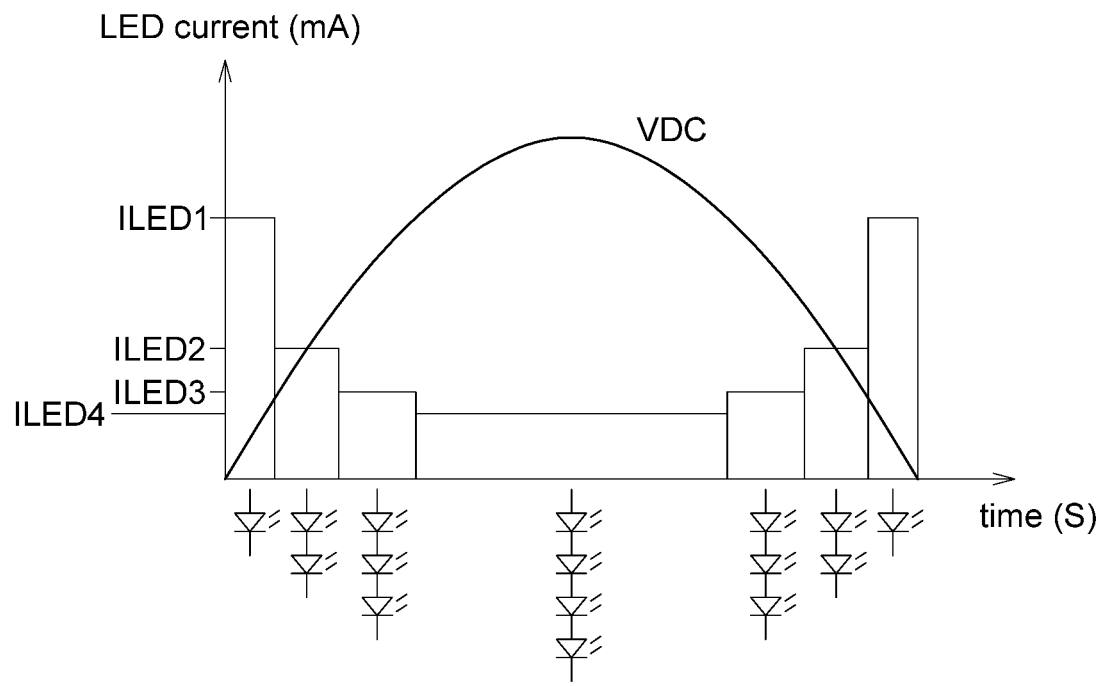
FIG. 3A and FIG. 3B show waveforms of the LED current and the LED intensity according to one embodiment of the disclosure.
Figure 3B:
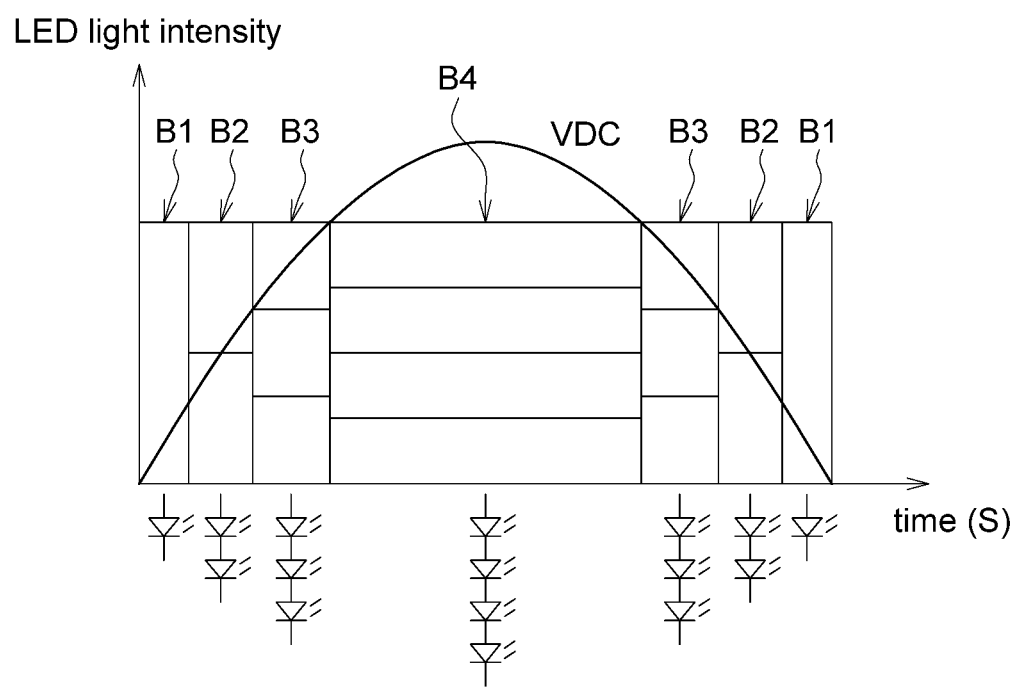

FIG. 3A and FIG. 3B show waveforms of the LED current and the LED intensity according to one embodiment of the disclosure. For simplicity, it is assumed that the segmented LED loading 50 includes four LED segments each including one single LED.

As shown in FIG. 3A and FIG. 3B, when the input voltage VDC is lower, in response to control from the LED segment regulating control module 120, one LED segment (or said one LED) is turned on. In order to control constant light intensity of the system, the current ILDE1 flowing the turned-on LED is controlled to be maximum and thus the LED output light intensity B1 of the turned-on LED is also maximum.

Then, the input voltage VDC is increased. In response to control from the LED segment regulating control module 120, two LED segments (or said two LEDs) are turned on. In order to control constant light intensity of the system, the current ILDE2 flowing the two turned-on LEDs is controlled to be one half of the initial current; and the LED output light intensity of each of the two turned-on LEDs is also one half of the initial LED output light intensity B1. B2 refers to the total LED output light intensity of the two turned-on LEDs, wherein B2=B1.

Then, the input voltage VDC is further increased. In response to control from the LED segment regulating control module 120, three LED segments (or said three LEDs) are turned on. In order to control constant light intensity of the system, the current ILDE3 flowing the three turned-on LEDs is controlled to be one third of the initial current; and the LED output light intensity of each of the three turned-on LEDs is also one third of the initial LED output light intensity B1. B3 refers to the total LED output light intensity of the three turned-on LEDs, wherein B3=B1.

Then, the input voltage VDC is further increased. In response to control from the LED segment regulating control module 120, four LED segments (or said four LEDs) are turned on. In order to control constant light intensity of the system, the current ILDE4 flowing the four turned-on LEDs is controlled to be one fourth of the initial current; and the LED output light intensity of each of the four turned-on LEDs is also one fourth of the initial LED output light intensity B1. B4 refers to the total LED output light intensity of the four turned-on LEDs, wherein B4=B1.

In one embodiment of the disclosure, taken FIG. 3A as an example, the relationship between ILED1-ILED4 is: ILED2=(½)*ILED1, ILED3=(⅓)*ILED1 and ILED4=(¼)*ILED1.

Because the total LED light intensity of the segmented LED loading 50 is proportional to the LED current and the number of the turn-on LED(s), wherein B1=B2=B3=B4.

That is, in one embodiment of the disclosure, if the number of the turn-on LED(s) of the segmented LED loading 50 is increased and the input voltage is increased, the current ILED of the segmented LED loading 50 is decreased; and if the number of the turn-on LED(s) of the segmented LED loading 50 is decreased and the input voltage is decreased, the current ILED of the segmented LED loading 50 is increased, to achieve constant light intensity. That is, based on the cross voltage of the segmented LED loading 50 (i.e. the input voltage VDC), the LED segment regulating control module 120 controls the current ILED of the segmented LED loading 50.

If the input voltage VDC is increased and the number of the turn-on LED(s) of the segmented LED loading 50 is increased, the LED current regulating module 130 decreases the LED current and thus the light intensity from one single LED is also decreased. By so, even if different LED segments are turned on, the system may also achieve constant light intensity.

Further, in the adaptive voltage regulating circuit 115, the capacitor cross voltage of the parallel-connected capacitors C1-C3 is higher than the lowest voltage to provide the LED current corresponding to the lowest LED voltage. That is, taken FIG. 3A as an example, when one LED is turned on, the LED current is ILED1 and in the adaptive voltage regulating circuit 115, the capacitor cross voltage of the parallel-connected capacitors C1-C3 may provide the LED current ILED1.

Figure 4:
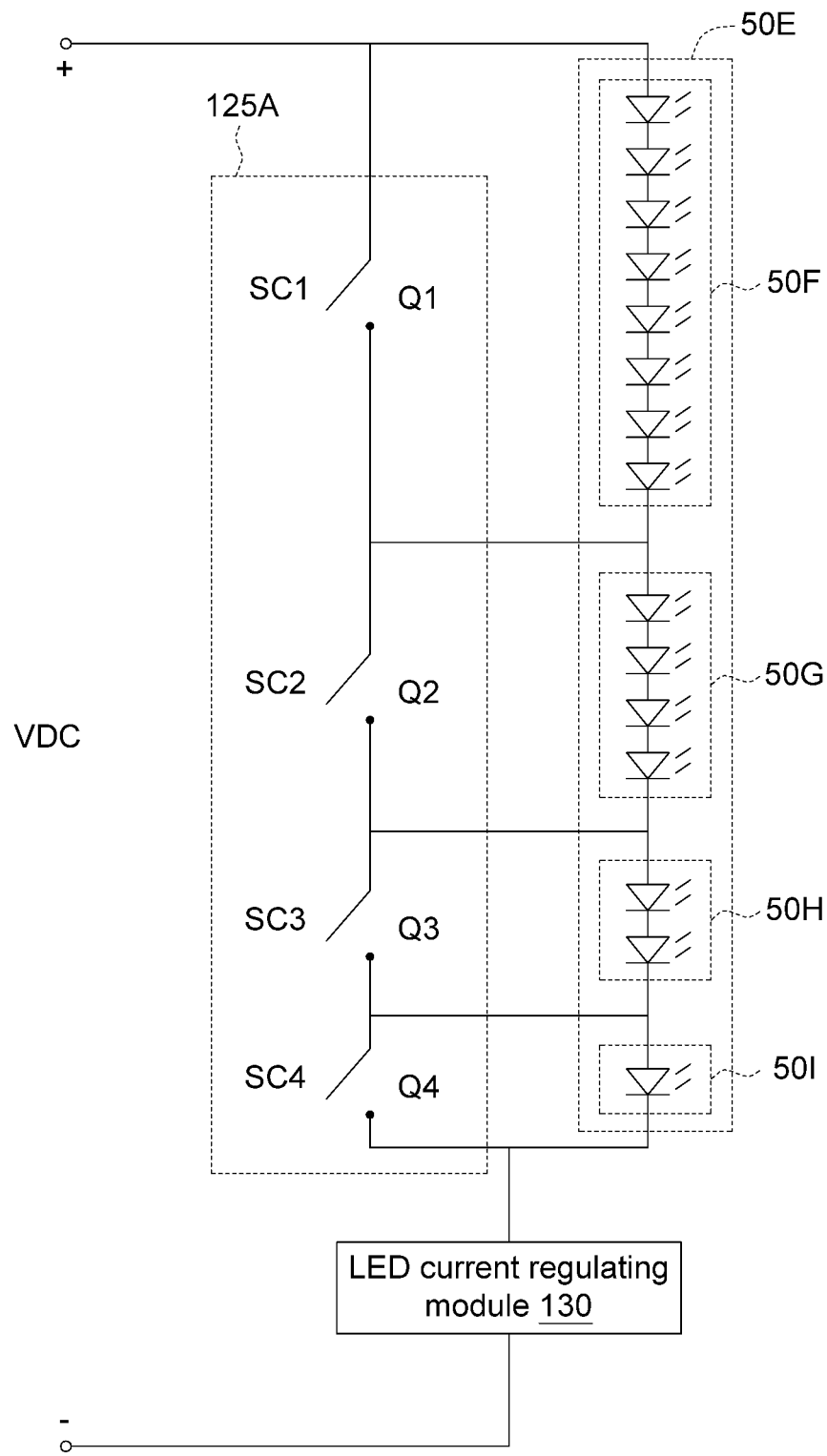
FIG. 4 shows LED arrangements according to another possible embodiment of the disclosure.

FIG. 4 shows LED arrangements according to another possible embodiment of the disclosure. As shown in FIG. 4, the LED segment switch module 125A includes four switches Q1-Q4, controlled by the switch control signals SC1-SC4 from the LED segment regulating control module 120, respectively. The segmented LED loading 50E includes four LED segments 50F-50I and the LED segments 50F-50I include eight LEDs, four LEDs, two LEDs and one LED, respectively. Details about controlling and turning on the LEDs are as above and are skipped here.

In the embodiment, each of the LED segments 50F-50I of the segmented LED loading 50E includes different number of LEDs and the lowest voltage is equal to the cut-in voltage of one single LED of the LED segment 50I. That is, the adaptive voltage regulating circuit 115 controls the input voltage VDC generated from the DC voltage to be higher than the cut-in voltage of one single LED for preventing flicking caused by current blind area.

In design of the adaptive voltage regulating circuit 115, the number of the capacitor stages and the minimum capacitance of the adaptive voltage regulating circuit 115 are designed based on energy for keeping the lowest LED segment in constant light intensity in the LED driving circuit 100, wherein taking FIG. 2B as an example, the number of the capacitor stages is three. In here, the lowest LED segment refers to the LED segment having fewest LEDs. As shown in FIG. 4, the lowest LED segment is the LED segment 50I.

Figure 5:
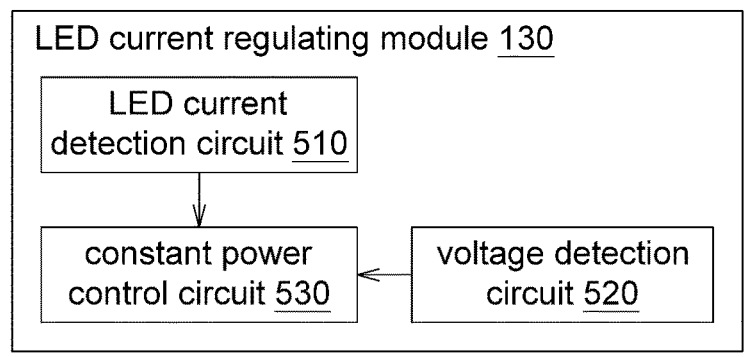
FIG. 5 shows a functional block diagram of an LED current regulating module according to one embodiment of the disclosure.

FIG. 5 shows a functional block diagram of the LED current regulating module 130 according to one embodiment of the disclosure. The LED current regulating module 130 includes an LED current detection circuit 510, a voltage detection circuit 520 and a constant power control circuit 530. The constant power control circuit 530 is coupled to the LED current detection circuit 510 and the voltage detection circuit 520. LED status of the segmented LED loading 50 is feedback controlled by the LED current detection circuit 510, the voltage detection circuit 520 and the constant power control circuit 530 of the LED current regulating module 130, to regulate current of each LED segment and to adjust LED light intensity for constant power control. The LED current detection circuit 510 is for detecting the current ILED flowing through the segmented LED loading 50. The voltage detection circuit 520 is for detecting the LED voltage of the segmented LED loading 50. The constant power control circuit 530 is for performing constant power control based on the current and the LED voltage of the segmented LED loading 50.

Figure 6:
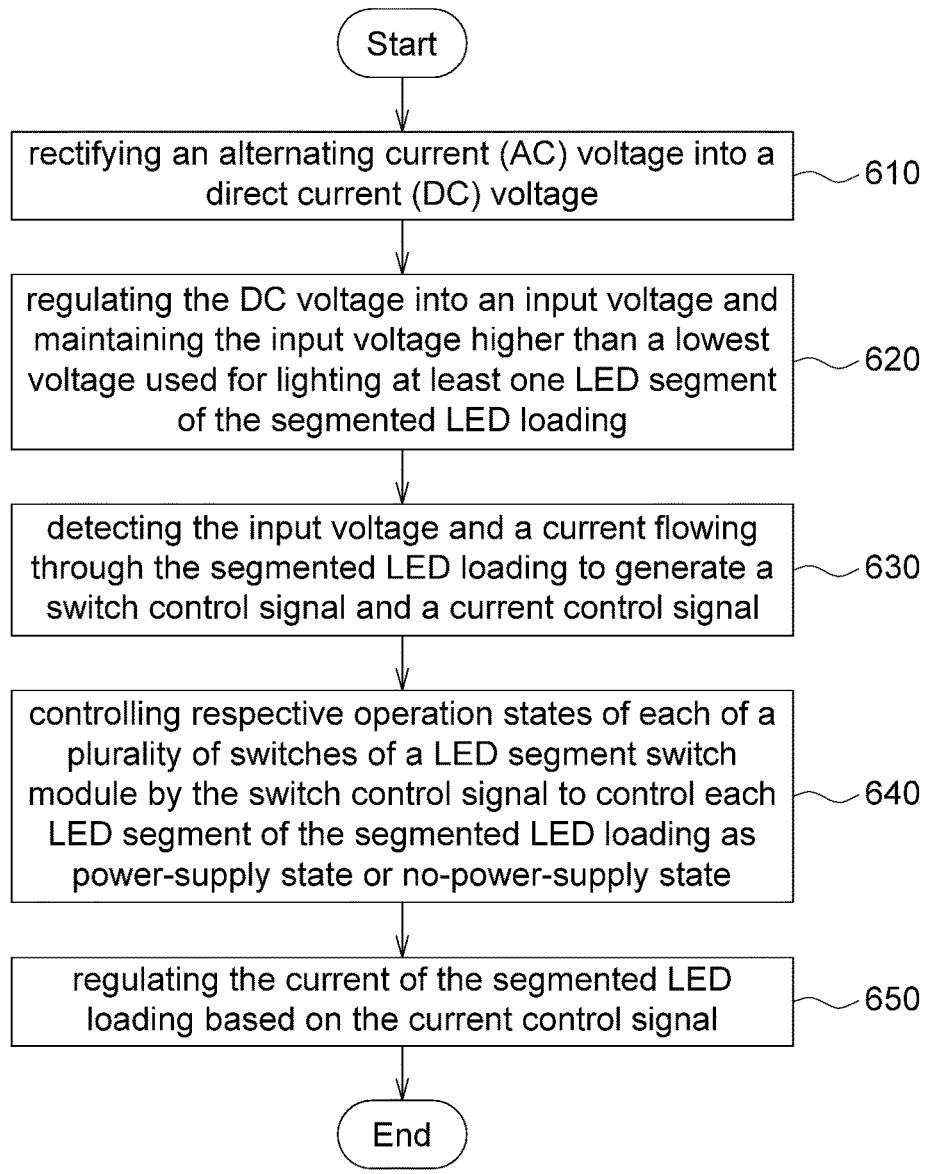
FIG. 6 shows a flow chart diagram of an LED driving method according to one embodiment of the disclosure.

FIG. 6 shows a flow chart diagram of an LED driving method according to one embodiment of the disclosure. The LED driving method is suitable for driving the segmented LED loading 50. As shown in FIG. 6, the LED driving method includes: in step 610, rectifying an alternating current (AC) voltage into a direct current (DC) voltage; in step 620, regulating the DC voltage into an input voltage and maintaining the input voltage higher than a lowest voltage used for lighting at least one LED segment of the segmented LED loading; in step 630, detecting the input voltage and a current flowing through the segmented LED loading to generate a switch control signal and a current control signal; in step 640, controlling respective operation states of each of a plurality of switches of a LED segment switch module by the switch control signal to control each LED segment of the segmented LED loading as power-supply state or no-power-supply state; and in step 650, regulating the current of the segmented LED loading based on the current control signal.

The LED driving circuit in the embodiments of the disclosure is an AC direct driving LED driving circuit. The adaptive voltage regulating circuit may output a variable output voltage to the segmented LED loading and the LED segment regulating control module detects the feedback input voltage and the LED current. Via constant intensity (or constant brightness) control by the LED current regulating control module, the flicking problem caused by inconstant intensity (or inconstant brightness) is prevented.

Further, in embodiments of the disclosure, the DC voltage generated by the rectifying circuit and/or the capacitor cross voltage of the parallel-connected capacitors of the adaptive voltage regulating circuit is maintained as being higher than the lowest voltage of the segmented LED loading. Thus, the flicking problem caused by current blind area is also prevented.

Still further, the embodiments of the disclosure do not use large-sized electrolytic capacitor, and thus the circuit size is reduced and the circuit life cycle is improved. Therefore, the embodiments of the disclosure are suitable for the small-sized lighting (for example light bulb).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A light emitting diode (LED) driving circuit for driving a segmented LED loading, the LED driving circuit including:
   a rectifying circuit for rectifying an alternating current (AC) voltage into a direct current (DC) voltage;
   an adaptive voltage regulating circuit, coupled to the rectifying circuit, the adaptive voltage regulating circuit regulating the DC voltage into an input voltage and maintaining the input voltage higher than a lowest voltage used for lighting at least one LED segment of the segmented LED loading;
   an LED segment regulating control module coupled to the adaptive voltage regulating circuit for detecting the input voltage and a current flowing through the segmented LED loading to generate a switch control signal and a current control signal;
   an LED segment switch module coupled to the LED segment regulating control module, the LED segment switch module including a plurality of switches, respective operation states of each of the switches being controlled by the switch control signal to control each LED segment of the segmented LED loading as power-supply state or no-power-supply state; and
   an LED current regulating module coupled to the LED segment regulating control module and the segmented LED loading, the LED current regulating module being controlled by the current control signal to regulate the current of the segmented LED loading;

wherein the LED current regulating module includes:
an LED current detecting circuit for detecting the current of the segmented LED loading;
a voltage detecting circuit for detecting an LED voltage of the segmented LED loading; and
a constant power control circuit coupled between the LED current detecting circuit and the voltage detecting circuit, for performing constant power control based on the current and the LED voltage of the segmented LED loading.

2. The LED driving circuit according to claim 1, wherein a number of LED segments of the segmented LED loading is larger or equal to 2; and
a number of switches of the LED segment switch module is larger or equal to the number of LED segments of the segmented LED loading minus 1.

3. The LED driving circuit according to claim 1, wherein the LED segment regulating control module includes a microcontroller and a digital-to-analog converter (DAC),
the microcontroller is coupled to the DAC for outputting the switch control signal to the LED segment switch control module based on the input voltage and the current of the segmented LED loading, to decide the respective operation states of each of the switches of the LED segment switch module; and
the microcontroller outputs signals to the DAC based on the input voltage and the current of the segmented LED loading; and accordingly the DAC outputs the current control signal to the LED current regulating module to control the current of the segmented LED loading.

4. The LED driving circuit according to claim 1, wherein the adaptive voltage regulating circuit is a valley fill circuit formed by a plurality stages of capacitors.

5. The LED driving circuit according to claim 4, wherein when the DC voltage is higher than a capacitor cross voltage of the plurality stages of capacitors which are parallel-connected, the input voltage is determined based on the DC voltage rectified by the rectifying circuit.

6. The LED driving circuit according to claim 4, wherein when the DC voltage is lower than a capacitor cross voltage of the plurality stages of capacitors which are parallel-connected, the input voltage is determined based on the capacitor cross voltage of the plurality stages of capacitors which are parallel-connected.

7. A light emitting diode (LED) driving method for driving a segmented LED loading, the LED driving method including:
rectifying an alternating current (AC) voltage into a direct current (DC) voltage;
regulating the DC voltage into an input voltage and maintaining the input voltage higher than a lowest voltage used for lighting at least one LED segment of the segmented LED loading;
detecting the input voltage and a current flowing through the segmented LED loading to generate a switch control signal and a current control signal;
controlling respective operation states of each of a plurality of switches of a LED segment switch module by the switch control signal to control each LED segment of the segmented LED loading as power-supply state or no-power-supply state;
regulating the current of the segmented LED loading based on the current control signal;
detecting the current of the segmented LED loading;
detecting an LED voltage of the segmented LED loading; and
performing constant power control based on the current and the LED voltage of the segmented LED loading.

8. The LED driving method according to claim 7, wherein the DC voltage is regulated by an adaptive voltage regulating circuit into the input voltage;
the adaptive voltage regulating circuit is a valley fill circuit formed by a plurality stages of capacitors; and
when the DC voltage is higher than a capacitor cross voltage of the plurality stages of capacitors which are parallel-connected, the input voltage is determined based on the DC voltage.

9. The LED driving method according to claim 7, wherein the DC voltage is regulated by an adaptive voltage regulating circuit into the input voltage;
the adaptive voltage regulating circuit is a valley fill circuit formed by a plurality stages of capacitors; and
when the DC voltage is lower than a capacitor cross voltage of the plurality stages of capacitors which are parallel-connected, the input voltage is determined based on the capacitor cross voltage of the plurality stages of capacitors which are parallel-connected.

10. The LED driving method according to claim 7, wherein the step of controlling the respective operation states of the plurality of switches of the LED segment switch module by the switch control signal to control each LED segment of the segmented LED loading as power-supply state or no-power-supply state includes:
when the input voltage is increased, controlling the respective operation states of the plurality of switches of the LED segment switch module to increase a number of turn-on LEDs of the segmented LED loading; and
when the input voltage is decreased, controlling the respective operation states of the plurality of switches of the LED segment switch module to decrease the number of the turn-on LEDs of the segmented LED loading.

11. The LED driving method according to claim 7, wherein the step of regulating the current of the segmented LED loading based on the current control signal includes:
when the input voltage is increased, decreasing the current of the segmented LED loading; and
when the input voltage is decreased, increasing the current of the segmented LED loading.

12. The LED driving method according to claim 7, wherein in controlling the respective operation states of the plurality of switches of the LED segment switch module and controlling the current of the segmented LED loading, the current of the segmented LED loading is controlled based on the input voltage.

13. The LED driving circuit according to claim 1, wherein the plurality of switches of the LED segment switch module are serially connected.

* * * * *